US011410360B2

(12) United States Patent
Ruth et al.

(10) Patent No.: US 11,410,360 B2
(45) Date of Patent: Aug. 9, 2022

(54) TECHNIQUES FOR MANAGING MULTI-USER CONTENT IN AUGMENTED REALITY APPLICATIONS

(71) Applicant: University of Washington, Seattle, WA (US)

(72) Inventors: Kimberly C. Ruth, Seattle, WA (US); Tadayoshi Kohno, Seattle, WA (US); Franziska Roesner, Seattle, WA (US)

(73) Assignee: UNIVERSITY OF WASHINGTON, Seattle, WA (US)

( * ) Notice: Subject to any disclaimer, the term of this patent is extended or adjusted under 35 U.S.C. 154(b) by 120 days.

(21) Appl. No.: 16/875,833

(22) Filed: May 15, 2020

(65) Prior Publication Data

US 2020/0364915 A1 Nov. 19, 2020

Related U.S. Application Data

(60) Provisional application No. 62/849,816, filed on May 17, 2019.

(51) Int. Cl.
*G06T 11/60* (2006.01)
*G06F 21/62* (2013.01)
(Continued)

(52) U.S. Cl.
CPC ............ *G06T 11/60* (2013.01); *G06F 21/604* (2013.01); *G06F 21/6218* (2013.01); *G06T 11/001* (2013.01)

(58) Field of Classification Search
None
See application file for complete search history.

(56) References Cited

U.S. PATENT DOCUMENTS 10,319,150 B1 6/2019 Canada et al.
2010/0083096 A1* 4/2010 Dupuis-Latour ..... G06F 40/106
715/234

(Continued)

FOREIGN PATENT DOCUMENTS

WO 2014/031899 A1 2/2014

OTHER PUBLICATIONS

Alexander, J., "'Ugandan Knuckles' is overtaking VRChat: VRChat's new favorite joke is problematic," Polygon, Jan. 8, 2018, <https://www.polygon.com/2018/8/8/16863932/ugandan-knuckles-meme-vrchat> [retrieved Aug. 12, 2020], pp. 1-4.

(Continued)

*Primary Examiner* — Tapas Mazumder
(74) *Attorney, Agent, or Firm* — Christensen O'Connor Johnson Kindness PLLC

(57) ABSTRACT

In some embodiments, a method of providing visual cues for private virtual objects is provided. In response to determining that presentation of a protected characteristic of a virtual object is not permitted by an augmented reality system, the augmented reality system presents a placeholder object. In some embodiments, a method of protecting a location from undesirable virtual objects is provided. In response to determining that a location for a virtual object is associated with a protected location, a low-invasiveness version of a mesh of the virtual object is presented. In some embodiments, a method of decoupling a virtual object from a static physical location is provided.

19 Claims, 13 Drawing Sheets

(51) Int. Cl.
G06F 21/60 (2013.01)
G06T 11/00 (2006.01)

(56) References Cited

U.S. PATENT DOCUMENTS

| | | | | |
|---|---|---|---|---|
| 2017/0123750 | A1* | 5/2017 | Todasco | G06F 21/10 |
| 2018/0046339 | A1* | 2/2018 | Naidoo | G06F 3/0484 |
| 2018/0081519 | A1 | 3/2018 | Kim | |
| 2019/0385334 | A1* | 12/2019 | Hong | G06T 11/00 |
| 2020/0186953 | A1* | 6/2020 | Mate | G06F 3/04883 |
| 2020/0302681 | A1* | 9/2020 | Totty | G06T 7/74 |
| 2020/0364915 | A1 | 11/2020 | Ruth et al. | |

OTHER PUBLICATIONS

Alvarez, E., "Facebook's next big augmented reality push is multiplayer games," Engadget, Sep. 7, 2018, <https://www.engadget.com/2018-09-07-facebook-ar-games-multiplayer-first-look.html> [retrieved Aug. 12, 2020], pp. 1-12.
ARCore: Google Developers <https://developers.google.com/ar/>.
ARKit: Augmented Reality, © 2020 Apple Inc. <https://developer.apple.com/arkit/>.
AR Studio <https://developers.facebook.com/ products/camera-effects/ar-studio/>.
Butz, A., et al., "Of Vampire Mirrors and Privacy Lamps: Privacy Management in Multi-User Augmented Environments," Proc. ACM UIST '98 (Symp. on User Interface Software and Technology), San Francisco, CA, Nov. 2-4, 1998, pp. 171-172.
Butz, A., et al., "Enveloping Users and Computers in a Collaborative 3D Augmented Reality," IEEE Explore, Downloaded Aug. 12, 2020, pp. 1-10.
Chiang, J. T., et al., "Secure and Precise Location Verification Using Distance Bounding and Simultaneous Multilateration," WiSec '09, Mar. 16-19, 2009, Zurich, Switzerland, pp. 181-191.
Curtis, S., "Sex pests are using Apple AirDrop to send explicit pictures to unsuspecting commuters", Aug. 2017, <https://www.mirror.co.uk/tech/sex-pests- using-apple- airdrop-10987968>.
D'Antoni, L.., et al., "Operating System Support for Augmented Realizty Applications," HotOS, 2013, pp. 1-7.
De Guzman, J. A., et al., "Security and Privacy Approaches in Mixed Reality: A Literature Survey," ACM Comput. Surv. 52(6), Article 110 (Oct. 2019), 37 pages, arXiv:1802 05797v3 [cs.CR], Jun. 10, 2020.
Denning, T., et al., "In Situ with Bystanders of Augmented Reality Glasses: Perspectives on Recording and Privacy-Mediating Technologies," CHI 2014, Apr. 26-May 1, 2014, Toronto, ON, Canada, 10 pages.
Digi-Capital, "Ubiquitous $90 billion AR to dominate focused $15 billion VR by 2022", Jan. 26, 2018, <https://www.digi-capital.com/news/2018/01/>.
Felt, A. P., et al., "How to Ask for Permission," HotSec, 2012, 6 pages.
Ferraiolo, D. F., et al., "Role-Based Access Controls," 15th National Computer Security Conference (1992), Baltimore, Oct. 13-16, 1992, pp. 554-563.
Fink, C., "The Trillion Dollar 3D Telepresence Gold Mine," Forbes, Nov. 20, 2017, <https://www.forbes.com/sites/ charliefink/2017/11/20/the-trillion-dollar-3d- telepresence- gold-mine/#42b8f0a12a72>.
Gaebel, E., "Looks Good to Me: Authentication for Augmented Reality," master's thesis, Virginia Polytechnic Institute and State University, Falls Church, Virginia, 2016, pp. 1-91.
Gaebel, E., et al., "Looks Good to Me: Authentication for Augmented Reality," TrustED '16, Oct. 28, 2016, Vienna, Austria, pp. 57-67.
Gallagher, J., "Upcoming Game Easily Shows You How to Master Paintball," Next Reality Mobile AR News: Apple AR, Aug. 24, 2017, <https://mobile-ar.reality.news/ news/apple-ar-upcoming-game-easily-shows-you- master-paintball-0179651/>, [Retrieved Aug. 13, 2020], pp. 1-3.

Guler, R. A., et al., "DensePose: Dense Human Pose Estimation in the Wild," CVPR, 2018, arXiv:1802.00434v1 [cs.CV] Feb. 1, 2018, 12 pages.
Hancke, G. P. and Kuhn, M. G., "An RFID Distance Bounding Protocol," Proceedings of the First International Conference on Security and Privacy for Emerging Areas in Communications Networks, IEEE Computer Society, 2005, 7 pages.
Hayduk, L. A., "Personal Space: Where We Now Stand," Psychological Bulletin: American Psychological Association, Inc. 94(2): 293-335, 1983.
He, T., et al., "Range-Free Localization Schemes for Large Scale Sensor Networks," MobiCom '03, Sep. 14-19, 2003, San Diego, California, USA, 2003, pp. 81-95.
Houben, S., et al., "WatchConnect: A Toolkit for Prototyping Smartwatch-Centric Cross-Device Applications," Smartwatch Interaction, CHI 2015, Crossings, Apr. 18-23, 2015, Seoul, Republic of Korea, pp. 1247-1256.
Huang, D. Y., et al., "Pinning Down Abuse on Google Maps," 2017 International World Wide Web Conference Committee (IW3C2), Creative Commons CC BY 4.0 License, Apr. 3-7, 2017, Perth, Australia, pp. 1471-1479.
Hudson, S. E., et al., "Extensible Input Handling in the subArctic Toolkit," CHI 2005 Papers: Smart Interaction Techniques 2, Apr. 2-7, 2005, Portland, Oregon, USA, pp. 381-390.
Jana, S., et al., "Enabling Fine-Grained Permissions for Augmented Reality Applications with Recognizers," USENIX: The Advanced Computing Systems Association, included in the Proceedings of the 22nd USENIX Security Symposium, Aug. 14-16, 2013, Washington, D.C., USA, pp. 415-430.
Lampson, B. W., "Protection," in Proc. Fifth Princeton Symposium on Information Sciences and Systems, Princeton University, Mar. 1971, pp. 437-443, reprinted in Operating Systems Review, 8, Jan. 1, 1974, pp. 18-24.
Lazos, L. and Poodendran, R., "SeRLoc: Secure Range-Independent Localization for Wireless Sensor Networks," WiSe '04, Oct. 1, 2004, Philadelphia, Pennsylvania, USA, pp. 21-30.
Lebeck, K., et al., "How to Safely Augment Reality: Challenges and Directions," HotMobile '16, Feb. 26-27, 2016, St. Augustine, FL, USA, pp. 45-50.
Lebeck, K., et al., "Securing Augmented Reality Output," IEEE Computer Society, 2017, pp. 320-337.
Lebeck, K., et al., "Towards Security and Privacy for Multi-User Augmented Reality: Foundations with End Users," IEEE Computer Society, 2018, pp. 392-408.
Lebeck, K., et al., "Enabling Multiple Applications to Simultaneously Augment Reality: Challenges and Directions," Session 5: Human Matters, HotMobile '19, Feb. 27-28, 2019, Santa Cruz, CA, USA, pp. 81-86.
Li, L., et al. "Understanding Android app piggybacking: A systematic study of malicious code grafting," IEEE Transactions on Information Forensics and Security, 12(6): 1269-1284, Research Collection School of Information Systems, Jun. 2017.
Magic Leap <https://www.magicleap.com/#/home>.
Matney, L., "Jeff Koons' augmented reality Snapchat artwork gets 'vandalized'," Oct. 8, 2017 <https://techcrunch.com/ 2017/10/08/jeff-koons-augmented-reality- snapchat-artwork- gets-vandalized/>.
Mehta, D., et al., "Single-Shot Multi-Person 3D Pose Estimation from Monocular RGB," International Conference on 3D Vision (3DV 2018), Verona, Italy, IEEE, Sep. 2018, 16 pages.
Meta: Spatial Interface Design: Augmented Reality and Neuroscience, Meta Company, 2017 <https://devcenter.metavision.com/design/spatial- interface-design-principles-public-by-default>.
Metamorphis <https://www.metavision.com/>.
Microsoft: HoloLens, 2020.
Microsoft, "Hologram Stability," <https://developer.microsoft.com/en-us/windows/mixed-reality/hologram-stability>, Jul. 8, 2020, pp. 1-11.
Microsoft, "Announcing HoloLens2," <https://developer.microsoft.com/en-us/windows/mixed- reality/shared experiences in mixed reality>, pp. 1-3.

(56) References Cited

OTHER PUBLICATIONS

Morris, M. R., et al., "Mediating Group Dynamics through Tabletop Interface Design," Interacting with Digital Tabletops: IEEE Computer Graphics and Applications, 2006, pp. 65-73.
Olson Jr., D. R., "Evaluating User Interface Systems Research," UIST '07, Oct. 7-10, 2007, Newport, Rhode Island, USA, 2007, pp. 251-258.
Olsson, T., et al., "User evaluation of mobile augmented reality scenarios," Journal of Ambient Intelligence and Smart Environments 4: 29-47, 2012.
Olsson, T., et al., "Expected user experience of mobile augmented reality services: a user study in the context of shopping centres," Pers Ubiquit Comput 17: 287-304, 2013.
Porteski, L., et al., Normative Tensions in Shared Augmented Reality, in Proceedings of the ACM on Human-Computer Interaction, vol. 2, CSCW, Article 142 (Nov. 2018), ACM, New York, NY, 22 pages.
Raval, N., et al. "What You Mark is What Apps See," MobiSys '16, Jun. 25-30, 2016, Singapore, Singapore, 13 pages.
Reilly, D. F., et al., "SecSpace: Prototyping Usable Privacy and Security for Mixed Reality Collaborative Environments," ResearchGate, EICS '14, Jun. 17-20, 2017, Rome, Italy, 10 pages.
Rematasas, K., et al., "Soccer on Your Tabletop," CVPR, 2018, 10 pages.
Roesner, F., et al., "User-Driven Access Control: Rethinking Permission Granting in Modem Operating Systems," 33rd IEEE Symposium on Security and Privacy (Oakland 2012), pp. 1-15.
Roesner, F., et al. "World-Driven Access Control for Continuous Sensing," Microsoft Research Tech Report MSR-TR-2014-67, May 2014, 12 pages.
Roesner, F., et al., "Security and Privacy for Augmented Reality Systems," Preprint; Submitted Nov. 2012, Revised Feb. 2013, Accepted Apr. 2013, pp. 1-10.
Sastry, N., et al., "Secure Verification of Location Claims," WiSE '03, Sep. 19, 2003, San Diego, California, USA, 10 pages.
Schaub, F., et al., "Password Entry Usability and Shoulder Surfing Susceptibility on Different Smartphone Platforms," MUM '12, Dec. 4-6, 2012, Ulm, Germany, 10 pages.
Scott, S.D., Carpendale, M.S.T., & Inkpen, K.M., (2004), Territoriality in Collaborative Tabletop Workspaces. In Proceedings of the ACM Conference on Computer-Supported Cooperative Work (CSCW) '04, Nov. 6-10, 2004,Chicago, IL, USA, 10 pages.
Scott, S.D., et al., "System Guidelines for Co-located Collaborative Work on a Tabletop Display," ECSCW 2003, Spring, Dordrecht, pp. 159-178.
Shen, C., et al., "UbiTable: Impromptu Face-to-Face Collaboration on Horizontal Interactive Surfaces," The Fifth International Conference on Ubiquitous Computing, UbiComp 2003, Oct. 12-15, 2003, Seattle, Washington, USA, 9 pages.

Sluganovic, I., et al., "HoloPair: Securing Shared Augmented Reality Using Microsoft HoloLens," ACSAC '17, Dec. 4-8, 2017, San Juan, PR, USA, 12 pages.
Sutherland, I. E., "A head-mounted three dimensional display," Fall Joint Computer Conference, 1986, pp. 757-764.
Szalavari, Z., et al., "Collaborative Gaming in Augmented Reality," VRST '98, Taipei, Taiwan, Nov. 2-5, 1998, pp. 195-204.
Takahashi, D., "Spatial raises $8 million for augmented reality collaboration platform," VentureBeat, Oct. 24, 2018, <https://venturebeat.com/2018/10/24/spatial-raises-8-million-for-augmented-reality-collaboration-platform/> [retrieved Aug. 17, 2020], pp. 1-8.
Tari, F., et al., "A Comparison of Perceived and Real Shoulder-surfing Risks between Alphanumeric and Graphical Passwords," Symposium on Usable Privacy and Security (SOUPS) 2006, Jul. 12-14, 2006, Pittsburgh, PA, USA, 11 pages.
Templeman, R., et al., "PlaceAvoider: Steering First-Person Cameras Away from Sensitive Spaces," NDSS '14, Feb. 23-26, 2014, San Diego, CA, USA, pp. 1-15.
Tilton, R., "Daydream Labs: positive social experiences in VR," Google, <blog.google/products/google-vr/daydream-labs-positive-social>, Aug. 9, 2016, pp. 1-4.
Ubiquity6 <https://ubiquity6.com>.
Wang, X., et al., "STAMP: Enabling Privacy-Preserving Location Proofs for Mobile Users," IEEE/ACM Transactions on Networking (24)6: 3276-3289, Dec. 2016.
Wang, L., et al., "A Logic-based Framework for Attribute based Access Control," CCS '04, Oct. 25-29, 2004, Washington, DC, USA, 12 pages.
Wijesekera, P., et al., "The Feasibility of Dynamically Granted Permissions: Aligning Mobile Privacy with User Preferences," 2017 IEEE Symposium on Security and Privacy: IEEE Computer Society, pp. 1077-1092.
Wu, M. and Balakrishnan, R., "Multi-Finger and Whole Hand Gestural Interaction Techniques for Multi-User Tabletop Displays," UIST '03 Vancouver, BC, Canada, letters chi 5(2): 193-202.
Xu, Y., et al., "BragFish: Exploring Physical and Social Interaction in Co-located Handheld Augmented Reality Games," Advances in Computer Entertainment Technology 2008, Yokohama, Japan, pp. 276-283.
Zhang, F., et al., "ViewDroid: Towards Obfuscation-Resilient Mobile Application Repackaging Detection," WiSec '14, Jul. 23-25, 2014, Oxford, UK, 12 pages.
Zhou, W., et al., "Detecting Repackaged Smartphone Applications in Third-Party Android Marketplaces," CODASPY 12, Feb. 7-9, 2012, San Antonio, Texas, USA, 10 pages.
Zhou, W., et al., "Applnk: Watermarking Android Apps for Repackaging Deterrence," ASIA CCS '13, May 8-10, 2013, Hangzhou, China, 12 pages.

\* cited by examiner

TECHNIQUES FOR MANAGING MULTI-USER CONTENT IN AUGMENTED REALITY APPLICATIONS

CROSS-REFERENCE TO RELATED APPLICATIONS

This application claims the benefit of Provisional Application No. 62/849,816, filed May 17, 2019, the entire disclosure of which is hereby incorporated by reference herein for all purposes.

STATEMENT OF GOVERNMENT LICENSE RIGHTS

This invention was made with government support under Grant Nos. CNS1513584 and CNS1565252 and CNS1651230, awarded by the National Science Foundation. The government has certain rights in the invention.

BACKGROUND

Augmented reality (AR), which overlays virtual content on top of the user's perception of the real world, has now begun to enter the consumer market. Besides smartphone platforms, early-stage head-mounted displays such as the Microsoft HoloLens are under active development. Many compelling uses of these technologies are multi-user: e.g., in-person collaborative tools, multiplayer gaming, and telepresence.

While prior work on AR security and privacy has studied potential risks from AR applications, new risks will also arise among multiple human users.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a computer-implemented method of providing visual cues for private virtual objects is provided. A first augmented reality system receives an object definition for a virtual object generated by a second augmented reality system. The object definition includes a location and a protected characteristic. The first augmented reality system determines whether presentation of the protected characteristic by the first augmented reality system is permitted. In response to determining that presentation of the protected characteristic by the first augmented reality system is permitted, the first augmented reality system presents the virtual object including the protected characteristic at the location. In response to determining that presentation of the protected characteristic by the first augmented reality system is not permitted, the first augmented reality system presents a placeholder object at the location.

In some embodiments, a computer-implemented method of protecting a location from undesirable virtual objects is provided. A first augmented reality system receives an object definition for a virtual object. The object definition includes a location and a mesh for the object. The first augmented reality system determines whether the location is associated with a protected location. In response to determining that the location is associated with a protected location, a low-invasiveness version of the mesh is presented. In response to determining that the location is not associated with a protected location, a default version of the mesh is presented.

In some embodiments, a computer-implemented method of decoupling a virtual object from a static physical location is provided. A first augmented reality system receives an object definition for a virtual object. The object definition includes a first location and a mesh. The first augmented reality system presents the mesh at the first location. The first augmented reality system receives a command to decouple the virtual object from the first location. The first augmented reality system presents the mesh at a second location other than the first location.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
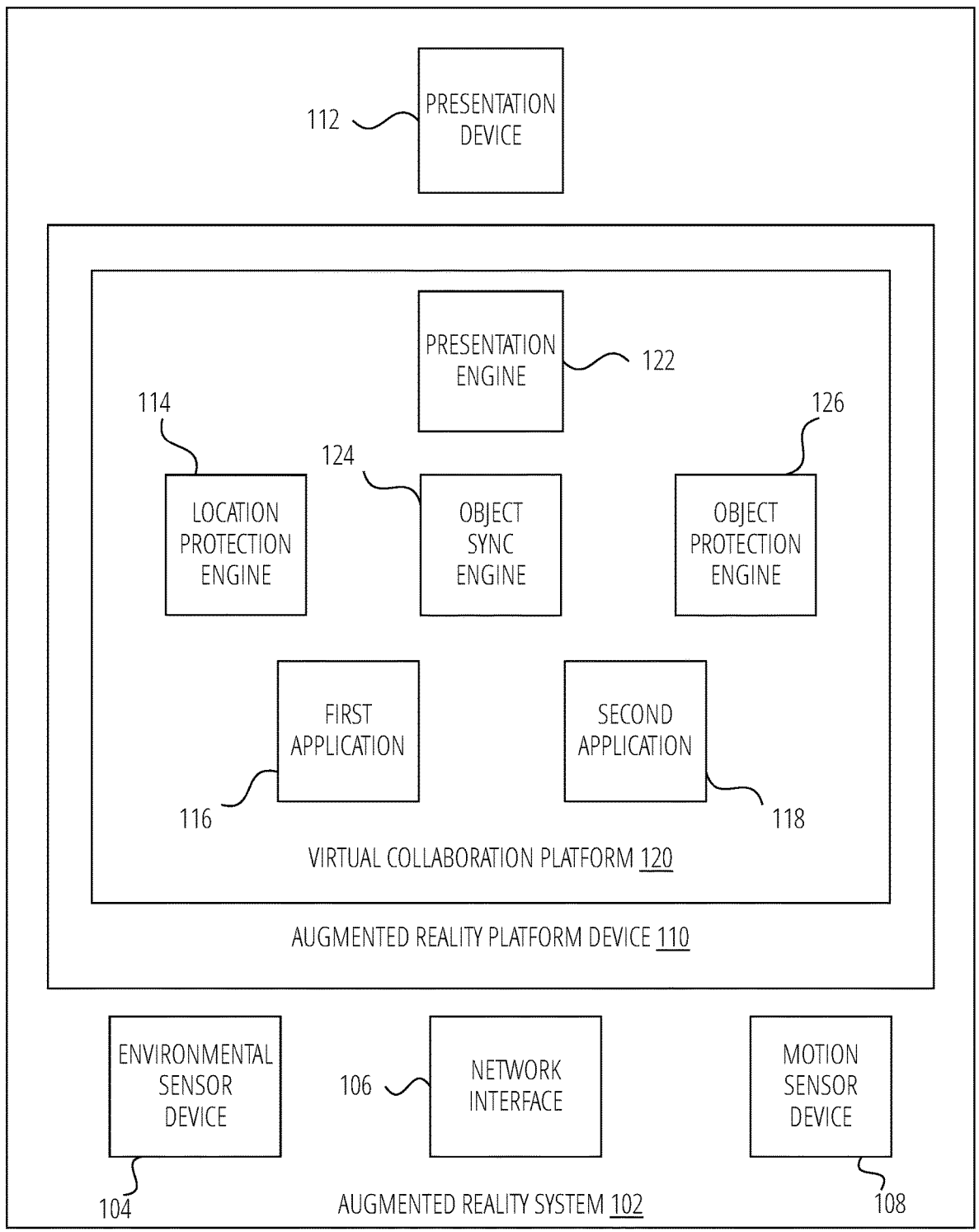
FIG. 1 is a block diagram that illustrates a non-limiting example embodiment of an augmented reality system according to various aspects of the present disclosure.

Many compelling use cases for AR will involve multiple users, each with their own AR device, who may be physically co-located or collaborating remotely and who may be interacting with shared virtual objects. In these contexts, the potential security, privacy, and safety risks for AR users come not only from the apps on their own devices but also from other users. For example, one user of a shared AR app might accidentally or intentionally spam other users with annoying or even disturbing virtual objects, or manipulate another person's virtual object (e.g., artwork) without permission. Indeed, even though multi-user AR technologies are not yet ubiquitous in the consumer market, precursors of such issues have already begun to emerge in the wild and in research settings today. In AR specifically, for example, there have been reports of "vandalism" of AR art in Snapchat, and a recent study found that pairs of AR users often positioned virtual objects in each other's personal space. Similar findings have been made in virtual reality (VR), where users have blocked each other's vision with virtual objects and invaded each other's personal space.

Thus, we can and should expect conflicts and tensions to arise between multiple AR users, which raises the critical question: how should AR platform and app designers handle these issues? Existing AR platforms provide limited or no support to app developers on this front. For example, though HoloLens supports running an app shared between multiple device users, it surfaces only basic cross-device messaging features, providing no framework for developers to reason about or support complex multi-user interactions.

In the present disclosure, we thus address the challenge of providing secure and private content sharing capabilities for multi-user augmented reality applications. Unlike prior AR security work that focused on protecting users from untrusted apps, we aim to limit undesirable interactions between mutually distrusting human users—similar to how traditional file system permissions attempt to separate mutually distrusting human users from each other. By addressing this issue before multi-user AR becomes widespread, we aim to inform the design of future AR systems, thereby preventing such multi-user concerns from manifesting broadly.

In our exploration of this space, however, we find that controlled sharing for AR content raises unique challenges not present in traditional settings such as file systems or shared online documents. The root cause of this complexity is AR's integration with the physical world. Because people share the same physical world, they may have certain expectations about how AR content is shared.

AR's integration with the physical world further complicates many access control design decisions. Consider the seemingly simple notion of Alice sharing an AR object with Bob: for instance, giving him read access to a piece of virtual artwork. When this object is shared, does Bob see the artwork in the same place as Alice (e.g., on a particular wall), or does Bob see his own instance of the object in a different place? The answer may depend on the semantics of the app, whether Alice and Bob are physically co-located, and many other design choices.

As another example, a user might want to have control of their personal physical space, not allowing another user to place too many virtual objects near them. Fulfilling requests to control personal physical space requires that either the second user is restricted in augmenting his or her own view of the world, or that the two users see different things. Diverging views of the world can violate expectations, however: consider watching or interacting with an AR object that only you can see while another AR user unknowingly steps into the space between you and your object.

In the present disclosure, we thus explore a set of multi-user AR case study apps that represent different points in the possible design space (co-located and remote users, opt-in versus opt-out sharing) to surface functionality and security goals for an AR sharing control module. We then present the design of such a module, which we envision as an app-level library or OS interface that can be leveraged by AR application developers. This module supports app developers in (1) allowing users to share AR content with other (co-located or remote) users, (2) allowing users to control both inbound and outbound AR content, while (3) addressing fundamental challenges raised by AR's integration with the physical world.

One challenge is to define and manage different ways that AR content might be mapped into the physical world—we do so by supporting both location-coupled objects (which all users see in the same physical place) and location-decoupled objects (for which users see their own copies in separate locations), and by managing the resulting impact of these types of objects on sharing and access control functionality. Another challenge is to address potential discontinuities in user expectations around private content in a shared physical world—we do so by introducing "ghost" objects (also referred to interchangeably herein as "placeholder objects") that allow users to share with other AR users that they are interacting with a virtual object without sharing sensitive details about that object. Finally, a third challenge is to respect users' possible sense of ownership of physical space (e.g., personal space)—to that end, our design supports policies for how to handle AR objects that are within a protected region (e.g., making objects closer to a user more transparent to that user). Through our exploration, we find that no single sharing control model will work for all apps, but that our proposed module can provide key features to support app developers in creating multi-user AR apps that meet users' expectations.

In some embodiments of the present disclosure, one or more of the following design goals are considered:

1. Supporting physically situated sharing: For some types of apps, physically co-located users will want to see the same virtual objects. A multi-user AR platform may support a way of sharing virtual state and a mapping between virtual objects and the physical world among the collaborating users.
2. Supporting physically decoupled sharing: For some types of apps, AR content may be synchronized for copies used by multiple users, regardless of the users' relative locations—whether in the same room, adjacent rooms, or halfway across the world.
3. Supporting real-time sharing: For some types of apps, interactions with other users will be expected to occur in real time. Thus, the platform may support low latency updates of shared state among multiple users, and any sharing control solution should not impose an undue performance burden.

A trivial solution that provides all of the above functionality would make all AR content public by default. However, interaction between multiple users may not always be positive. For example, a malicious or careless user may attempt to share unwanted or undesirable AR content with another user, see private AR content belonging to another user, or perform unwanted manipulation on AR content created by or belonging to another user. In response to such multi-user threats, one or more basic design paradigms may be used. For example, control of outbound content may be used. Sharing of AR content involves two parties: the originator of the content and the recipient. Different levels of "read" and "write" access for a virtual object in a shared AR environment for different recipients may cause users in the same physical space to not share the same view of the virtual space.

These disparate views of the virtual space are in sharp contrast to the traditional experience of physical spaces, where the physical presence of a device such as a smartphone or a television set enables the user of that device to both (1) signal to others that they are busy with that device, and (2) establish a dedicated spatial region upon which their use of the device depends. They physicality of the device, then, serves as a scaffold around which interpersonal norms have developed. For instance, a person might avoid standing in front of a television set while a user is watching it, and might refrain from blocking the line of sight from a user to the smartphone they are holding.

AR content has no such physicality. Consider, for example a shared AR whiteboard application. A user looking at or interacting with a private, unshared whiteboard will appear to a nearby user as staring into or manipulating empty space. There is no mechanism by which the user can exercise agency over their working space in the presence of other users, and no mechanism by which other users passing by can determine whether the object is five feet away from its owner or up against a more distant wall. As a result, one user may inadvertently stand in front of content that a second user is interacting with. Further adding to this issue, prior work has also shown that people can be uncomfortable with the presence of AR users due to not knowing what the AR user is doing, and private unshared content causes this rift even between users of the same AR platform. In some embodiments of the present disclosure, privacy is maintained while at least partially supporting a shared-world physical intuition by signaling the existence of AR objects being interacted with, without revealing the content of the AR objects themselves.

As another example of a design paradigm, we consider security properties from the perspective of the recipients of shared content. Since shared content can have serious implications for the receiver, such as spam or other unwanted intrusive content that obscures important real-world information or other virtual objects, some embodiments of the present disclosure allow users to protect physical locations being obscured by or otherwise associated with undesirable virtual content.

Because the right sharing control model is app-specific, AR app developers will need the ability to implement multi-user features with their chosen model. Accordingly, in some embodiments of the present disclosure, a flexible AR sharing control module is provided that can be leveraged by app developers. This module may be provided as an app-level library or an operating system interface that provides sharing control features. One advantage of an app-level library is that it does not require explicit changes to the underlying operating system (that is, an app developer could create an app that runs on different AR platforms and, by including the platform-appropriate version of a library, support interactions among users with different types of AR devices).

Embodiments of the present disclosure provide a flexible module that helps app developers create multi-user AR apps that incorporate shared AR content while mitigating the risk of undesirable interactions between multiple users. While useful in many scenarios, embodiments of the present disclosure may be particularly useful in the case of a developer building a single app and mediating the interactions of its multiple users, as opposed to cross-app communication, though similar techniques may be used between unrelated apps as well. Further, it may be assumed that the users trust both the developers of the apps as well as their operating systems, but do not necessarily trust each other. This trust dynamic is akin to traditional desktop environments—e.g., where two users of a Unix operating system might both trust the underlying system and installed apps, but might not trust each other and hence might not make their home directories world readable or world writable.

FIG. 1 is a block diagram that illustrates a non-limiting example embodiment of an augmented reality system according to various aspects of the present disclosure. The augmented reality system 102 includes many components that are typical for augmented reality systems. Though some of these components are illustrated and described herein, other components that are known to one of skill in the art to be present in the augmented reality system 102 are not described for the sake of brevity.

As shown, the augmented reality system 102 includes one or more environmental sensor devices 104, a network interface 106 one or more motion sensor devices 108, one or more presentation devices 112, and an augmented reality platform device 110. Typically, the environmental sensor devices 104, motion sensor devices 108, and presentation devices 112 are mounted to a headset that is worn by a user.

In some embodiments, the environmental sensor devices 104 include one or more traditional cameras, infrared cameras, stereoscopic cameras, time-of-flight sensors, LIDAR sensors, and/or other sensors that allow the augmented reality system 102 to collect information about the environment surrounding the augmented reality system 102. The information may be used by other components of the augmented reality system 102 for any purpose, including to detect, locate, and identify real-world objects in the environment.

In some embodiments, the network interface 106 includes hardware and/or software to allow the augmented reality system 102 to communicate with other computing devices, including but not limited to other augmented reality systems. In some embodiments, the network interface 106 may include hardware and/or software to allow the augmented reality system 102 to communicate via any suitable technique, including but not limited to wired techniques (including but not limited to Ethernet, USB, and FireWire), wireless techniques (including but not limited to 4G, 5G, LTE, Wi-Fi, WiMAX, and Bluetooth), and/or combinations thereof.

In some embodiments, the motion sensor devices 108 include one or more accelerometers, gyroscopes, and/or other devices that are configured to detect the motion of the augmented reality system 102 in three-dimensional space. The motion sensor devices 108 allow other components of the augmented reality system 102 to cause an augmented reality presentation to remain stationary with respect to the real world as experienced by the user.

In some embodiments, the presentation devices 112 include one or more display devices, loudspeakers, projectors, and/or other devices that are configured to present virtual objects to the user. Presenting a virtual object may include generating a visual representation of the virtual object, generating an auditory presentation of the virtual object, generating a haptic presentation related to the virtual object, or any combination thereof.

In some embodiments, the augmented reality platform device 110 includes one or more computing devices that provide computing resources for the augmented reality system 102. In some embodiments, the augmented reality platform device 110 may be incorporated into the headset. In some embodiments, the augmented reality platform device 110 may be a separate computing device that is communicatively coupled to the headset using any suitable communication technique, including but not limited to wired techniques (including but not limited to Ethernet, USB, and FireWire), wireless techniques (including but not limited to 4G, 5G, LTE, Wi-Fi, WiMAX, and Bluetooth), and/or combinations thereof. Each of the components illustrated as part of the augmented reality platform device 110 may be computer-executable instructions stored on a non-transitory computer-readable medium which, in response to execution by one or more processors of the augmented reality platform device 110, cause the augmented reality platform device 110 to provide the illustrated components.

As illustrated, the augmented reality platform device 110 includes a first application 116, a second application 118, and a virtual collaboration platform 120. In some embodiments, the virtual collaboration platform 120 manages hardware system resources of the augmented reality platform device 110. In some embodiments, the virtual collaboration platform 120 provides interfaces via which software components may communicate with each other and may access the system resources.

In some embodiments, the first application 116 may be a first application, or "app," that is designed to use the augmented reality system 102 to provide the benefits described herein. Some examples of a first application 116, including but not limited to a shared whiteboard application, an application that displays virtual objects that may be public or private, and an application that displays virtual objects in relation to physical locations, are described in more detail below.

In some embodiments, the second application 118 may be another application installed on the augmented reality platform device 110 and that is designed to use the virtual collaboration platform 120, or may be an application installed on the augmented reality platform device 110 that is not designed to use the virtual collaboration platform 120. In some embodiments, the second application 118 may be omitted, and only the first application 116 may be present on the augmented reality platform device 110. In some embodiments, applications other than the first application 116 and the second application 118 may also be installed on the augmented reality platform device 110.

As shown, the virtual collaboration platform 120 includes a location protection engine 114, an object synchronization engine 124, an object protection engine 126, and a presentation engine 122. The virtual collaboration platform 120 may also include other traditional components including but not limited to schedulers, memory managers, and so on. Since these other components are known to those of skill in the art, they have not been described in detail herein for the sake of brevity. In some embodiments, the virtual collaboration platform 120 is one or more application-level libraries that are loaded by the first application 116 and/or the second application 118 at run-time. In some embodiments, the virtual collaboration platform 120 is provided by an operating system of the augmented reality system 102, and is accessed by the first application 116 and/or the second application 118 via one or more application programming interfaces (APIs) provided by the operating system of the augmented reality system 102.

In some embodiments, the location protection engine 114 is configured to provide services for preventing AR applications from presenting virtual objects that will unduly interfere with physical locations marked by users as being protected. In some embodiments, the object synchronization engine 124 is configured to provide services for transmitting and receiving virtual object definitions and virtual object states between the augmented reality system 102 and another augmented reality system being used by another user. In some embodiments, the object protection engine 126 is configured to provide services for determining whether virtual objects received from other virtual collaboration platforms may be presented, or whether ghost versions of received virtual objects should be presented. Further description of the capabilities of the location protection engine 114, the object synchronization engine 124, and the object protection engine 126 is provided below.

In some embodiments, the presentation engine 122 is configured to present virtual objects using the presentation devices 112. In some embodiments, the presentation engine 122 may handle keeping virtual objects in a fixed relationship with respect to real-world objects. In some embodiments, the presentation engine 122 presents virtual objects based on commands or instructions received from the location protection engine 114, the object protection engine 126, and/or the object synchronization engine 124.

As used herein, "engine" refers to logic embodied in hardware or software instructions, which can be written in one or more programming languages, including but not limited to C, C++, C#, COBOL, JAVA™, PHP, Perl, HTML, CSS, JavaScript, VBScript, ASPX, Go, and Python. An engine may be compiled into executable programs or written in interpreted programming languages. Software engines may be callable from other engines or from themselves. Generally, the engines described herein refer to logical modules that can be merged with other engines, or can be divided into sub-engines. The engines can be implemented by logic stored in any type of computer-readable medium or computer storage device and be stored on and executed by one or more general purpose computers, thus creating a special purpose computer configured to provide the engine or the functionality thereof. The engines can be implemented by logic programmed into an application-specific integrated circuit (ASIC), a field-programmable gate array (FPGA), or another hardware device.

Further description of the actions performed by the components of the augmented reality system 102 is provided in the discussion below.

Placeholder Objects

As discussed above, one problem with the use of AR systems is that existing systems provide either complete sharing of virtual objects between multiple users, or no sharing of virtual objects between multiple users. This is a problem at least because if a first user is interacting with a virtual object that is not shared with a second user, the second user does not have any visual cues that indicate how to politely interact with the first user.

Figure 2:
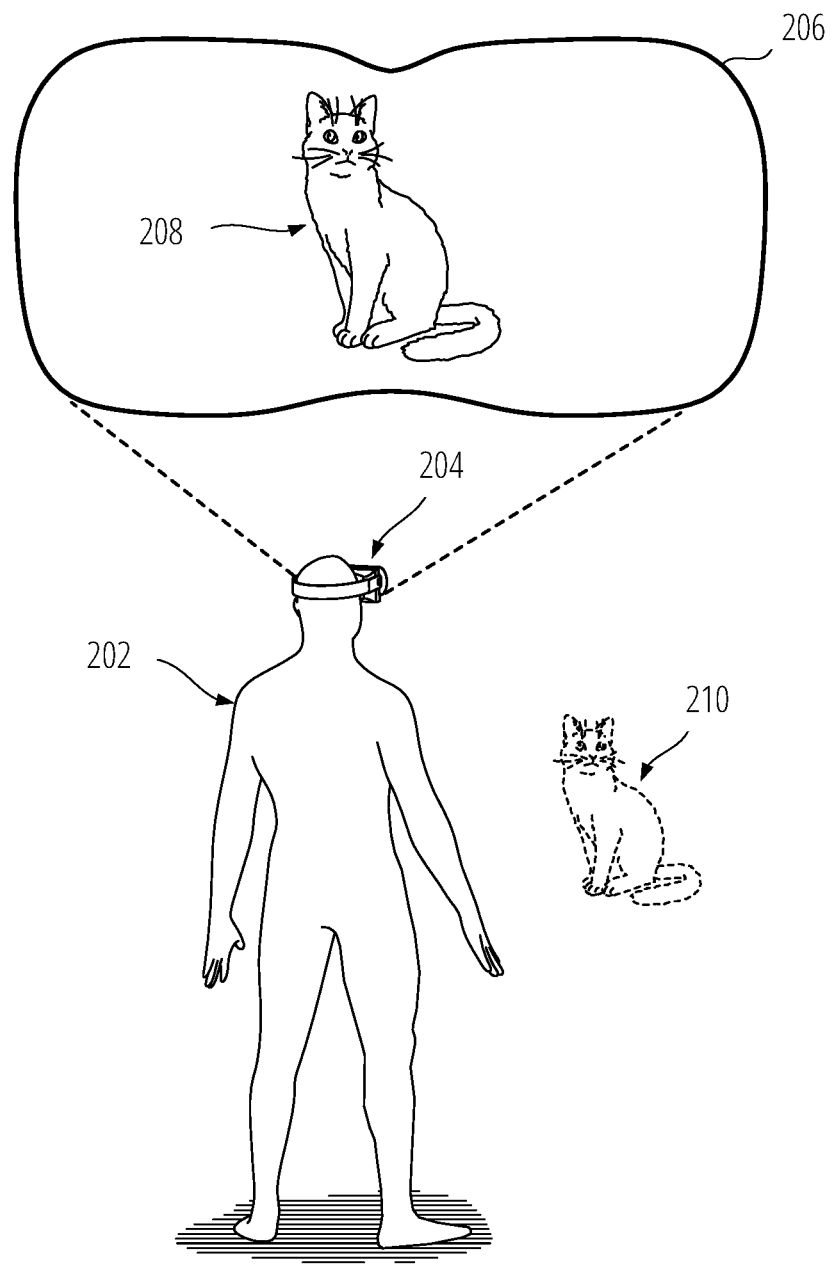
FIG. 2 is a schematic illustration of a first user interacting with a first virtual object according to various aspects of the present disclosure.

FIG. 2 is a schematic illustration of a first user interacting with a first virtual object according to various aspects of the present disclosure. As shown, the first user 202 is wearing a first augmented reality system 204, and is viewing a first display 206. A first virtual object 210 is presented to the first user 202 at a first physical location, and is shown in the first display 206 as a display of first virtual object 208.

Figure 3:
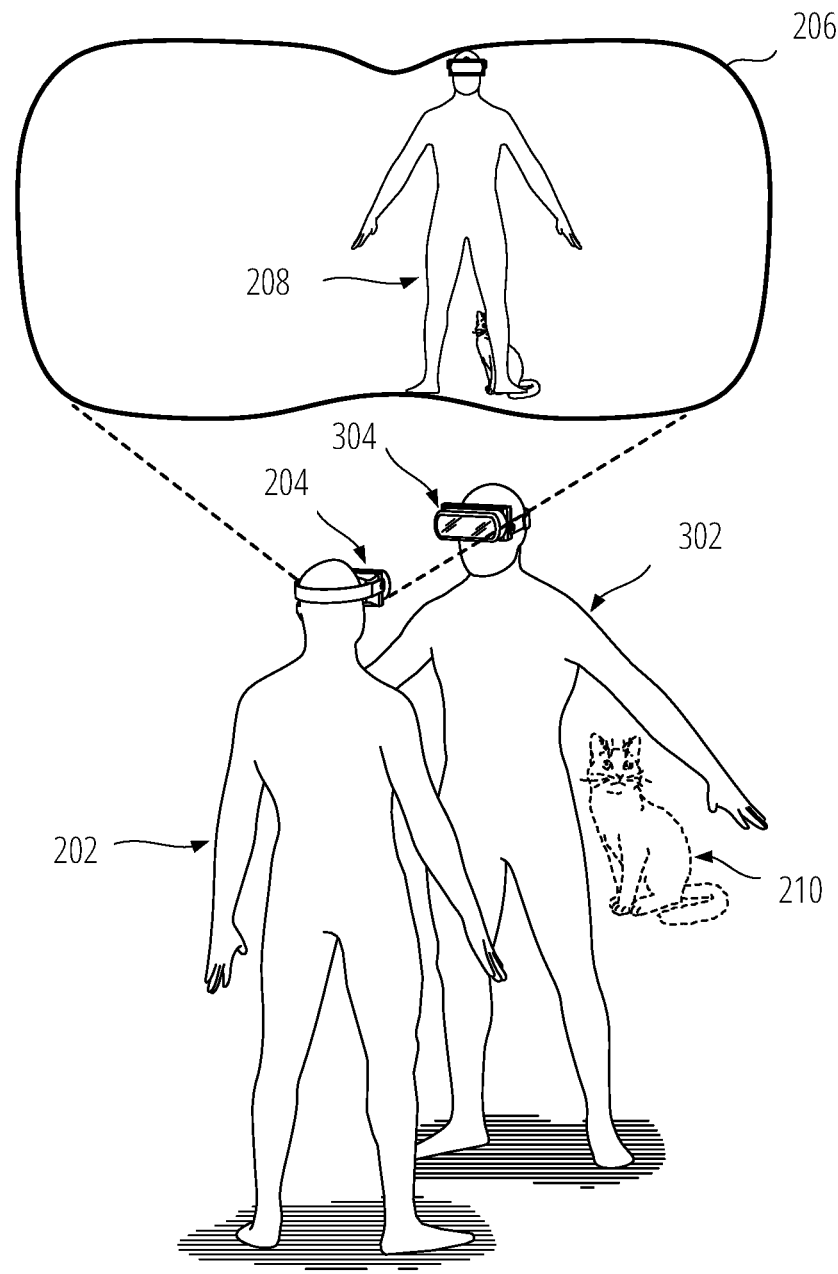
FIG. 3 is a schematic illustration of the problem that arises if the first virtual object is not shared by the first augmented reality system.

FIG. 3 is a schematic illustration of the problem that arises if the first virtual object is not shared by the first augmented reality system. In FIG. 3, a second user 302 wearing a second augmented reality system 304 has stepped between the first user 202 and the first physical location where the first virtual object 210 was being presented. Even though the second user 302 could see the first user 202 gesturing toward the first virtual object 210, there is no cue provided to the second user 302 by the second augmented reality system 304 to show where the first virtual object 210 is being presented. Accordingly, the display of first virtual object 208 in the first display 206 is blocked by the body of the second user 302.

Figure 4:
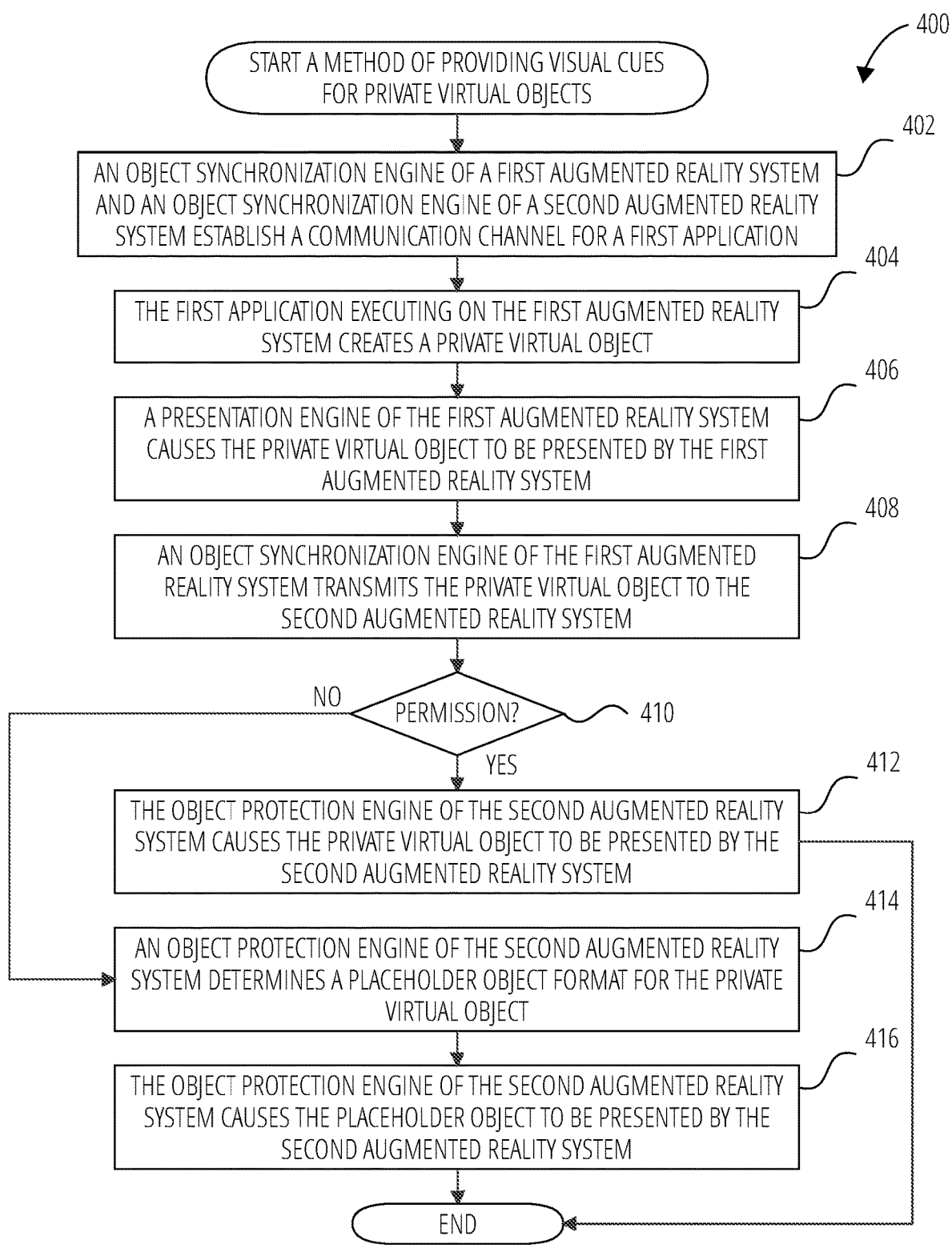
FIG. 4 is a flowchart that illustrates a non-limiting example embodiment of a method of providing visual cues for private virtual objects according to various aspects of the present disclosure.

FIG. 4 is a flowchart that illustrates a non-limiting example embodiment of a method of providing visual cues for private virtual objects according to various aspects of the present disclosure. By using the method 400, the situation illustrated in FIG. 3 can be avoided by providing the second user 302 with a cue so that the second user 302 can avoid blocking the physical location where the first virtual object 210 is being presented by the first augmented reality system 204. Further, the method 400 provides a cue to the second user 302 without requiring that the first virtual object 210 be completely presented to the second user 302.

From a start block, the method 400 proceeds to block 402, where an object synchronization engine 124 of a first augmented reality system 102 and an object synchronization engine 124 of a second augmented reality system 102 establish a communication channel for a first application 116. In some embodiments, the first application 116 may be executing on both the first augmented reality system 102 and the second augmented reality system 102. In some embodiments, the first application 116 may be executing on the augmented reality system 102, and the second augmented reality system 102 may provide the functionality of the virtual collaboration platform 120 within its operating system or otherwise without being provided within the first application 116.

In some embodiments, the object synchronization engine 124 of the first augmented reality system 102 and the object synchronization engine 124 of the second augmented reality system 102 may automatically detect each others' presence through wireless communication, such as Wi-Fi broadcasts, a Bonjour service, Bluetooth messages, NFC communication, or via any other suitable technique. In some embodiments, the first augmented reality system 102 and the second augmented reality system 102 may be manually paired with each other via Bluetooth or some other communication technique by the users. In some embodiments, each augmented reality system 102 executing the first application 116 may connect to a server, and the server may be used to establish communication channels and/or mediate communication between each augmented reality system 102 executing the first application 116.

At block 404, the first application 116 executing on the first augmented reality system 102 creates a private virtual object. Any type of virtual object, including but not limited to a pet, a whiteboard, an art object, a text window, or any other type of virtual object may be created. By making the virtual object a private virtual object, certain aspects of the virtual object will be shared with the second augmented reality system 102, but not all aspects of the virtual object will be presented by the augmented reality system 102 as discussed below. In some embodiments, virtual objects may be created as private virtual objects by default. In some embodiments, virtual objects may be created as private virtual objects in response to a selection of an option by the first user. Typically, the private virtual object will be associated with a physical location in the real world at which the private virtual object should be presented.

At block 406, a presentation engine 122 of the first augmented reality system 102 causes the private virtual object to be presented by the first augmented reality system 102. Similar to the illustration in FIG. 2, the presentation engine 122 may cause a presentation device 112 of the first augmented reality system 102 to present the private virtual object at the physical location associated with the private virtual object.

At block 408, an object synchronization engine 124 of the first augmented reality system 102 transmits the private virtual object to the second augmented reality system 102. In some embodiments, all of the characteristics of the private virtual object (both private aspects and aspects to be shared) are transmitted to the second augmented reality system 102. In some embodiments, only the aspects to be shared of the private virtual object are transmitted to the second augmented reality system 102. Aspects to be shared may include at least the physical location associated with the private virtual object, and may also include other aspects including one or more of a type of the private virtual object, a color of the private virtual object, and a size and/or shape associated with the virtual object. In some embodiments, the object synchronization engine 124 of the first augmented reality system 102 may transmit a specific placeholder object format to be used for presentation of the private virtual object. In some embodiments, the second augmented reality system 102 will be allowed some level of autonomy in choosing a placeholder object format that represents the aspects to be shared of the private virtual object.

The method 400 then proceeds to decision block 410, where a determination is made regarding whether the second augmented reality system 102 has permission to display the private virtual object. In some embodiments, the second augmented reality system 102 may not have permissions to display any private virtual object, and so the determination at decision block 410 will always result in NO. In some embodiments, permissions for displaying the private virtual object may depend on a level of access granted to the to the private virtual object for the second user of the second augmented reality system 102, which may be determined by a server or by the first augmented reality system 102. In such embodiments, the private virtual object transmitted to the second augmented reality system 102 may include both private aspects and aspects to be shared, and the determination at decision block 410 will decide what aspects of the private virtual object are to be presented.

If it is determined that the second augmented reality system 102 does have permission to display the private virtual object, then the result of decision block 410 is YES, and the method 400 proceeds to block 412, where an object protection engine 126 of the second augmented reality system 102 causes the private virtual object to be presented by the second augmented reality system 102. This presentation of the private virtual object would include both the private aspects of the private virtual object and the aspects to be shared, and so would be similar (if not the same) as the presentation of the private virtual object by the first augmented reality system 102. The method 400 then proceeds to an end block and terminates.

Returning to decision block 410, if it is determined that the second augmented reality system 102 does not have permission to display the private virtual object, then the result of decision block 410 is NO, and the method 400 proceeds to block 414, where an object protection engine 126 of the second augmented reality system 102 determines a placeholder object format for the private virtual object. The placeholder object format for the private virtual object is determined based on the aspects to be shared for the private virtual object, and conceals the private aspects of the private virtual object. For example, in some embodiments, the placeholder object format may be a cloud, a box, a sphere, or another type of virtual object of a generic shape that is located at the physical location associated with the private virtual object. In some embodiments, the shape of the placeholder object format may be influenced by the size and/or shape of the private virtual object (e.g., a sphere or box having a height or width based on a height or width of the private virtual object) in order to provide a more accurate visual cue as to what the first user is interacting with.

At block 416, the object protection engine 126 of the second augmented reality system 102 causes the placeholder object to be presented by the second augmented reality system 102. By basing the placeholder object on only the aspects to be shared of the private virtual object, the private aspects may be kept secret by the first user, and so sensitive information that might be visible if the entire private virtual object were presented by the second augmented reality system 102 remains protected while still providing the user of the second augmented reality system 102 with a visual cue as to what the user of the first augmented reality system 102 is doing.

Figure 5:
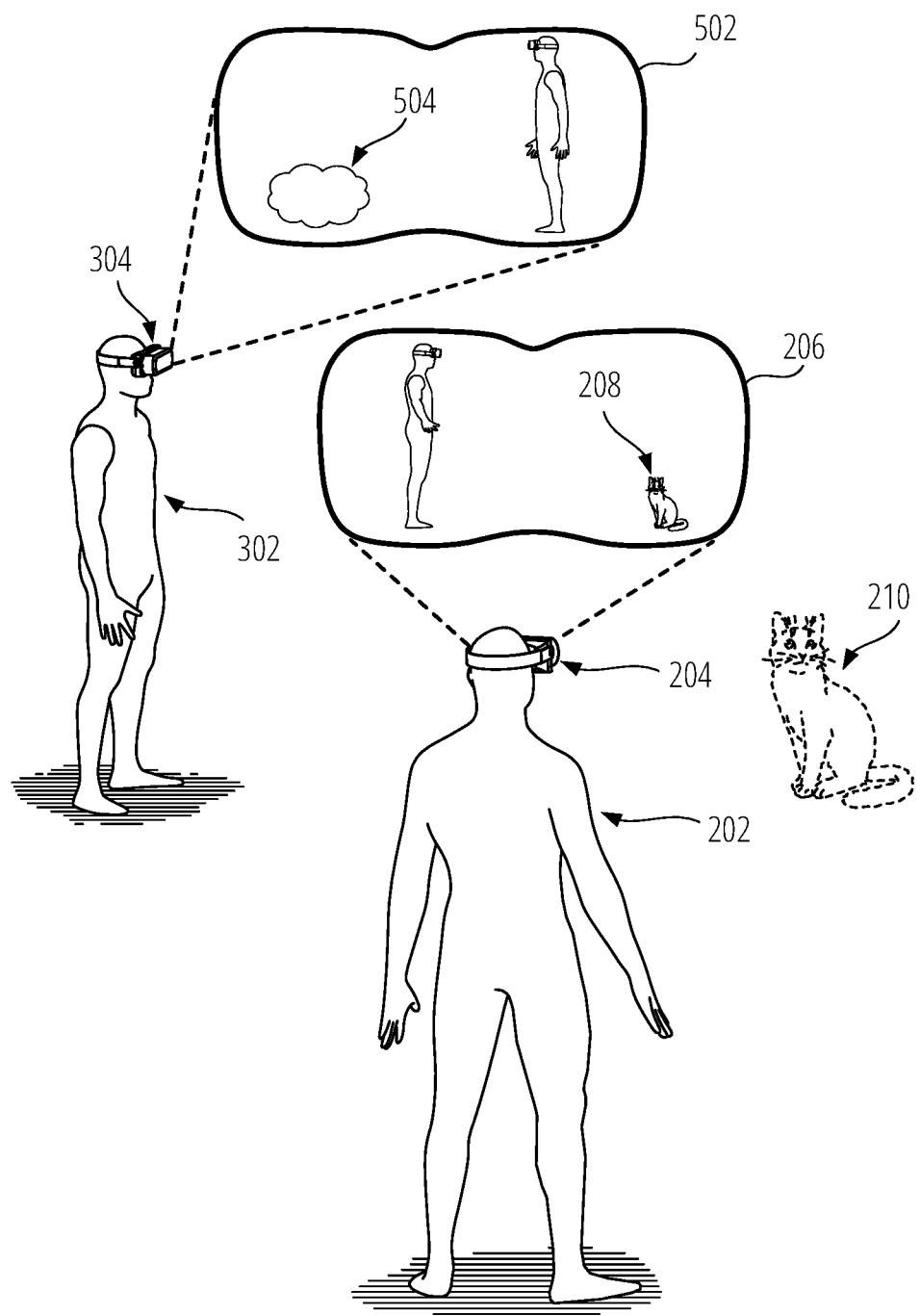
FIG. 5 is a schematic drawing that illustrates the result of the presentation of the private virtual object by the first augmented reality system and the presentation of the placeholder object by the second augmented reality system according to various aspects of the present disclosure.

FIG. 5 is a schematic drawing that illustrates the result of the presentation of the private virtual object by the first augmented reality system 102 and the presentation of the placeholder object by the second augmented reality system 102 according to various aspects of the present disclosure. In FIG. 5, the first user 202 is again viewing the first virtual object 210 using the first augmented reality system 204 (the first augmented reality system 102 of method 400). The first display 206 shows that the display of first virtual object 208 is now unobstructed by the second user 302. This is because the second display 502 of the second augmented reality system 304 (the second augmented reality system 102 of method 400) is presenting a placeholder object 504 at the location of the first virtual object 210.

As illustrated, the placeholder object 504 is a cloud object of the approximate size of the first virtual object 210, and is located at the physical location of the first virtual object 210, but does not disclose any other information about the first virtual object 210. This visual cue allows the second user 302 to position themselves out of the line of sight between the first user 202 and the first virtual object 210, while still maintaining the confidentiality of any potentially sensitive aspects of the first virtual object 210.

Returning to FIG. 4, the method 400 then proceeds to an end block and terminates. Though the method 400 is described as terminating here for the sake of clarity, in some embodiments, the method 400 continues or loops in order to continue presenting the private virtual object, and/or to present additional private virtual objects.

Protecting Physical Locations

As discussed above, another problem with the use of AR systems that allow shared virtual objects to be created by multiple users is that a second, untrusted user may cause virtual objects to be created that obscure, deface, or are otherwise undesirable with respect to a real-world object.

Figure 6:
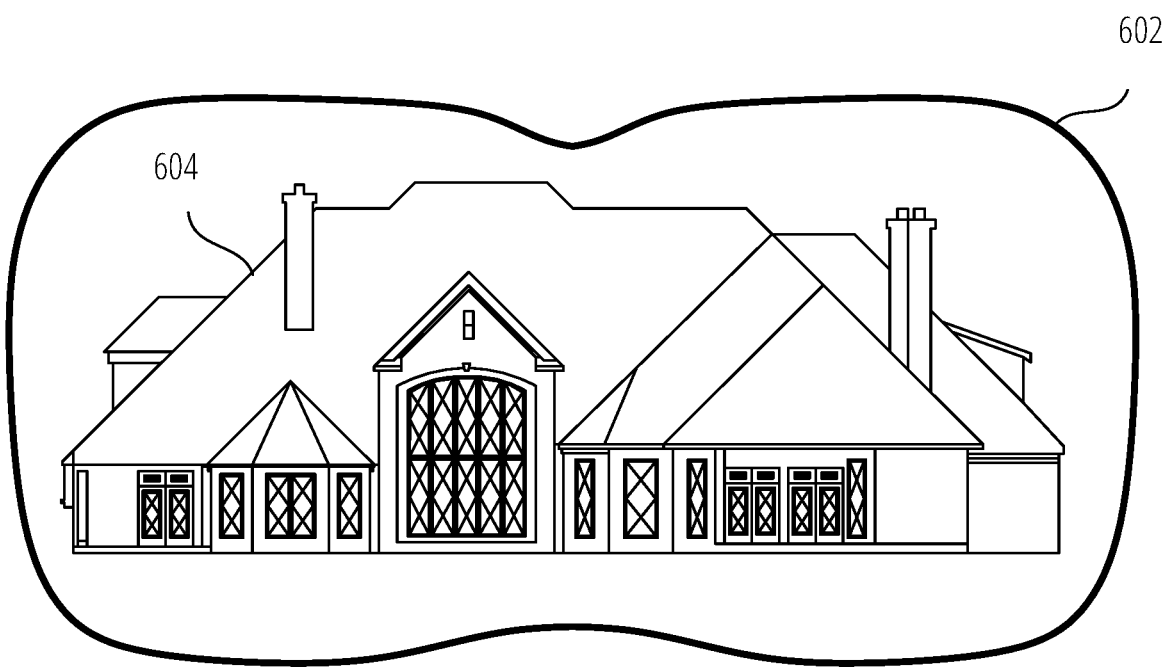
FIG. 6 and FIG. 7 are schematic drawings that illustrate one non-limiting example embodiment of a problem that can arise when untrusted users are allowed to create shared virtual objects without restrictions.
Figure 7:

FIG. 6 and FIG. 7 are schematic drawings that illustrate one non-limiting example embodiment of a problem that can arise when untrusted users are allowed to create shared virtual objects without restrictions. In FIG. 6, a first display 602 presented to a first user is shown. In the first display 602, a physical location 604 can be seen. As illustrated, the physical location 604 is a house (likely a house belonging to the first user), but any other type of physical location may be relevant. In FIG. 6, no virtual objects are shown. In FIG. 7, the first display 602 now includes a virtual object 702 generated by a second user. As shown, the virtual object 702 obstructs the view of the physical location 604, which is likely not desirable. At best, the virtual object 702 merely obstructs the view of the physical location 604. In more malicious scenarios, the virtual object 702 may include rude or insulting content directed at the physical location 604, similar to graffiti or other vandalism. What is desired is a way to allow sharing of virtual objects, while at the same time allowing protection from obtrusive display of unwanted virtual objects.

Figure 8:
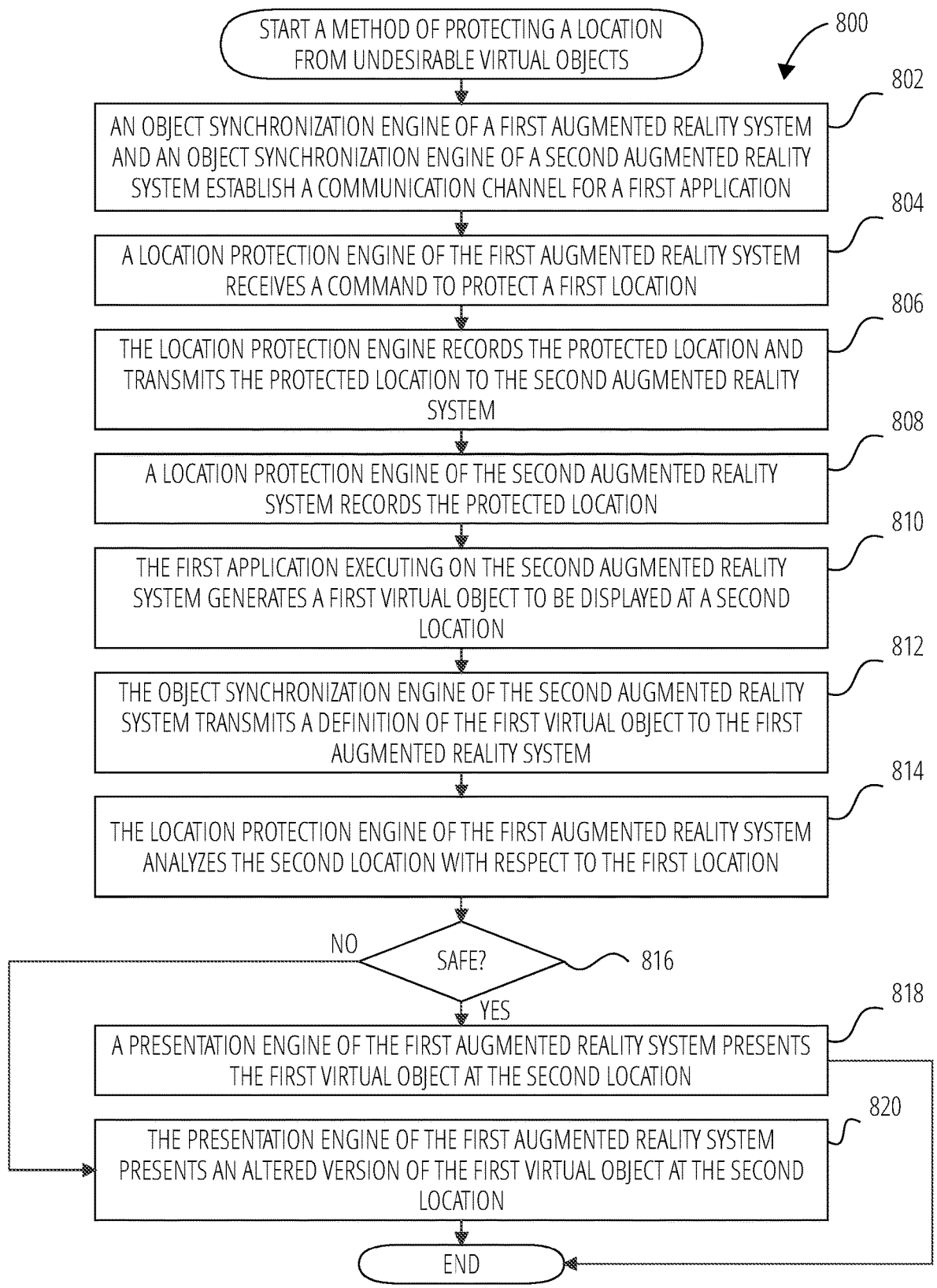
FIG. 8 is a flowchart that illustrates a non-limiting example embodiment of a method of protecting a location from undesirable virtual objects according to various aspects of the present disclosure.

FIG. 8 is a flowchart that illustrates a non-limiting example embodiment of a method of protecting a location from undesirable virtual objects according to various aspects of the present disclosure.

From a start block, the method 800 proceeds to block 802, where an object synchronization engine 124 of the first augmented reality system 102 and an object synchronization engine 124 of a second augmented reality system 102 establish a communication channel for a first application 116. The actions for establishing the communication channel may be similar to the actions described above with respect to block 402, and so are not described again here for the sake of brevity.

At block 804, a location protection engine 114 of the first augmented reality system 102 receives a command to protect a first location. In some embodiments, the command may be received from the first user using the first augmented reality system 102. In some embodiments, the command may specify a static physical location as the first location, such as a set of geographic coordinates, an address, or a fixed real-world object detected by the first augmented reality system 102. The first user may specify the command using any suitable technique, including but not limited to manual entry of the specification of the first location, using a controller or gesture associated with the first augmented reality system 102 to indicate the first location, or any other suitable technique. In some embodiments, the command may specify a dynamic physical location, including but not limited to a movable real-world object detected by the first augmented reality system 102, a user, or any other movable location. The dynamic physical location may specify a location relative to the movable location or object. In some embodiments, the command may specify a virtual object to be protected, such that the first location is a location associated with the virtual object.

At block 806, the location protection engine 114 records the protected location and transmits the protected location to the second augmented reality system 102. At block 808, a location protection engine 114 of the second augmented reality system 102 records the protected location. By sharing the protected location between the first augmented reality system 102 and the second augmented reality system 102, each augmented reality system 102 can be configured to generate similar presentations related to the protected location, and thereby provide a consistent experience to each user. In some embodiments, recording the protected location may include adding the protected location to a list of protected locations stored by each augmented reality system 102. In some embodiments, the list of protected locations may be managed by a server communicatively coupled to each augmented reality system 102 for ease of distribution and management of the list.

At block 810, the first application 116 executing on the second augmented reality system 102 generates a first virtual object to be displayed at a second location. In some embodiments, generating the first virtual object may include defining a mesh and/or other structures that describe an outer surface of the first virtual object. In some embodiments, generating the first virtual object may include defining a texture to be presented on an outer surface of the first virtual object. The second location may be specified with respect to a static physical location, a dynamic physical location, or another virtual object.

At block 812, the object synchronization engine 124 of the second augmented reality system 102 transmits a definition of the first virtual object to the first augmented reality system 102. In some embodiments, the transmitted definition includes the mesh, the second location, and/or any other information needed by the first augmented reality system 102 to generate a presentation of the first virtual object.

At block 814, the location protection engine 114 of the first augmented reality system 102 analyzes the second location with respect to the first location. In some embodiments, the analysis performed by the location protection engine 114 may include determining a distance between the second location and the first location, and may compare the distance to one or more threshold distance values. In some embodiments, the analysis performed by the location protection engine 114 may include determining whether the second location is within a line of sight from a location of the first augmented reality system 102 to the first location.

At decision block 816, a determination is made regarding whether the analysis of the second location with respect to the first location indicates that display of the first virtual object at the second location is safe. In some embodiments, the second location is safe with respect to the first location if the distance is greater than a threshold distance value (that is, if the second location is far enough away from the first location such that display of the first virtual object is unlikely to interfere with the first location). In some embodiments, the second location is safe with respect to the first location if it is not within a line of sight between the first augmented reality system 102 and the first location, and/or if a presentation of the first virtual object at the second location would not obstruct the line of sight. In some embodiments, the determination at decision block 816 may be made by the location protection engine 114 of the first augmented reality system 102, and the result may be provided to the location protection engine 114 of the second augmented reality system 102. In some embodiments, the determination may be made separately by the location protection engine 114 of the first augmented reality system 102 and the second augmented reality system 102, both of which should come to the same conclusion.

If it is determined that the display of the first virtual object at the second location is safe, then the result of decision block 816 is YES, and the method 800 proceeds to block 818, where a presentation engine 122 of the first augmented reality system 102 presents the first virtual object at the second location. The presentation of the first virtual object at the second location may proceed according to the definition of the first virtual object transmitted by the second augmented reality system 102 without any changes. The method 800 then advances to an end block and terminates.

Returning to decision block 816, if it is determined that the display of the first virtual object at the second location is not safe, then the result of decision block 816 is NO, and the method 800 proceeds to block 820. At block 820, the presentation engine 122 of the first augmented reality system 102 presents an altered version of the first virtual object at the second location. In some embodiments, the altered version of the first virtual object has a characteristic that is changed in order to reduce the interference of the first virtual object with the first location. For example, the presentation engine 122 may remove a texture of the first virtual object, and/or may reduce an opacity of at least a portion of the mesh of the first virtual object so that the first location can be seen through the first virtual object. In some embodiments, the opacity may be completely reduced to zero if the distance is less than the threshold distance value used in the analysis of decision block 816. In some embodiments, the opacity may be reduced by an amount that changes based on the distance. For example, if the distance is less than a first threshold distance value, the opacity may be changed to zero (that is, the first virtual object may be completely transparent), while if the distance is between the first threshold distance value and a second threshold distance value, the opacity may be changed to a value between zero and a specified opacity for of the mesh based on the distance (such that the closer the distance is to the first threshold distance value, the more transparent the first virtual object is). In some embodiments, the characteristic that is changed may be the second location itself. That is, the second location may be changed in order to move the second location to be a distance greater than the threshold distance value used in the analysis of decision block 816 from the first location. In some embodiments, the characteristic that is changed may be a color of at least a portion of the mesh. In some embodiments, the characteristic that is changed may be a size of the mesh. In some embodiments, if it is determined that the display of the first virtual object at the second location is not safe, creation of the first virtual object may be disallowed entirely.

As illustrated, the method 800 then proceeds to an end block and terminates. Though the illustrated embodiment of the method 800 showed a comparison to just one protected location, in some embodiments, the method 800 will analyze the second location with respect to each protected location stored in a list of protected locations. Also, though the illustrated embodiment of the method 800 is shown as terminating after block 818 or block 820, in some embodiments, the method 800 may continue to analyze additional virtual objects, and/or may update the presentations of existing virtual objects if the line of sight changes and/or if either the first location or the second location is dynamic.

Figure 9:
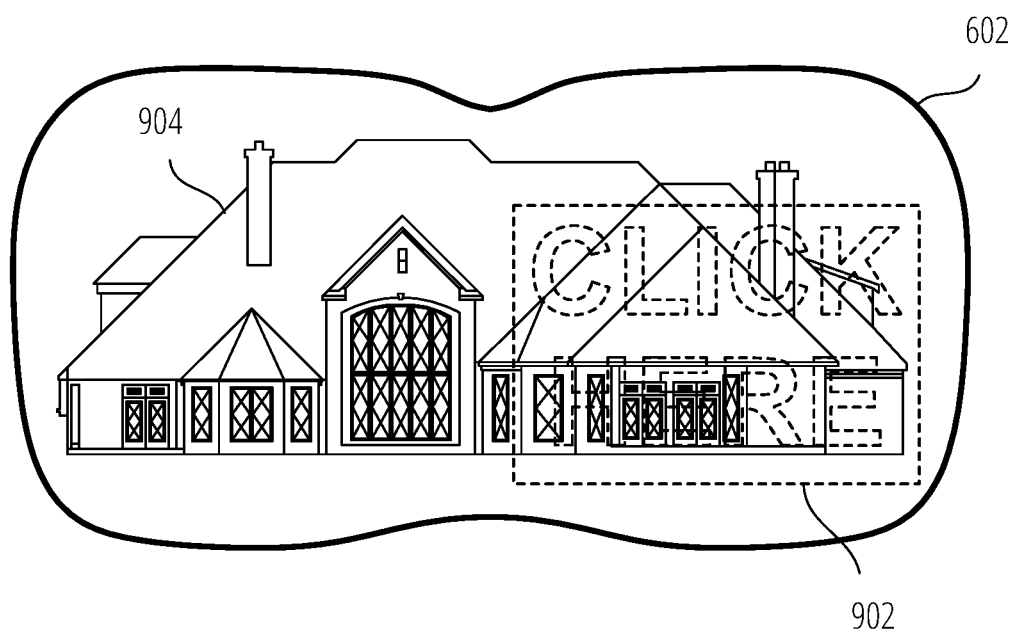
FIG. 9 is a schematic drawing that illustrates a non-limiting example embodiment of applying the techniques described in FIG. 8 to the problem illustrated in FIG. 7.

FIG. 9 is a schematic drawing that illustrates a non-limiting example embodiment of applying the techniques described in FIG. 8 to the problem illustrated in FIG. 7. As shown, a virtual object 902 has been provided that is not safe with respect to the protected location 904. Accordingly, at block 820, an altered version of the virtual object 902 was generated, and is shown presented in the first display 602 in a form with reduced opacity.

Decoupling Virtual Objects

As discussed above, another problem with the use of AR systems that allow shared virtual objects to be created by multiple users is that users may wish to decouple copies of shared virtual objects from each other, yet may wish to maintain a shared experience with respect to the shared virtual objects.

Figure 10:
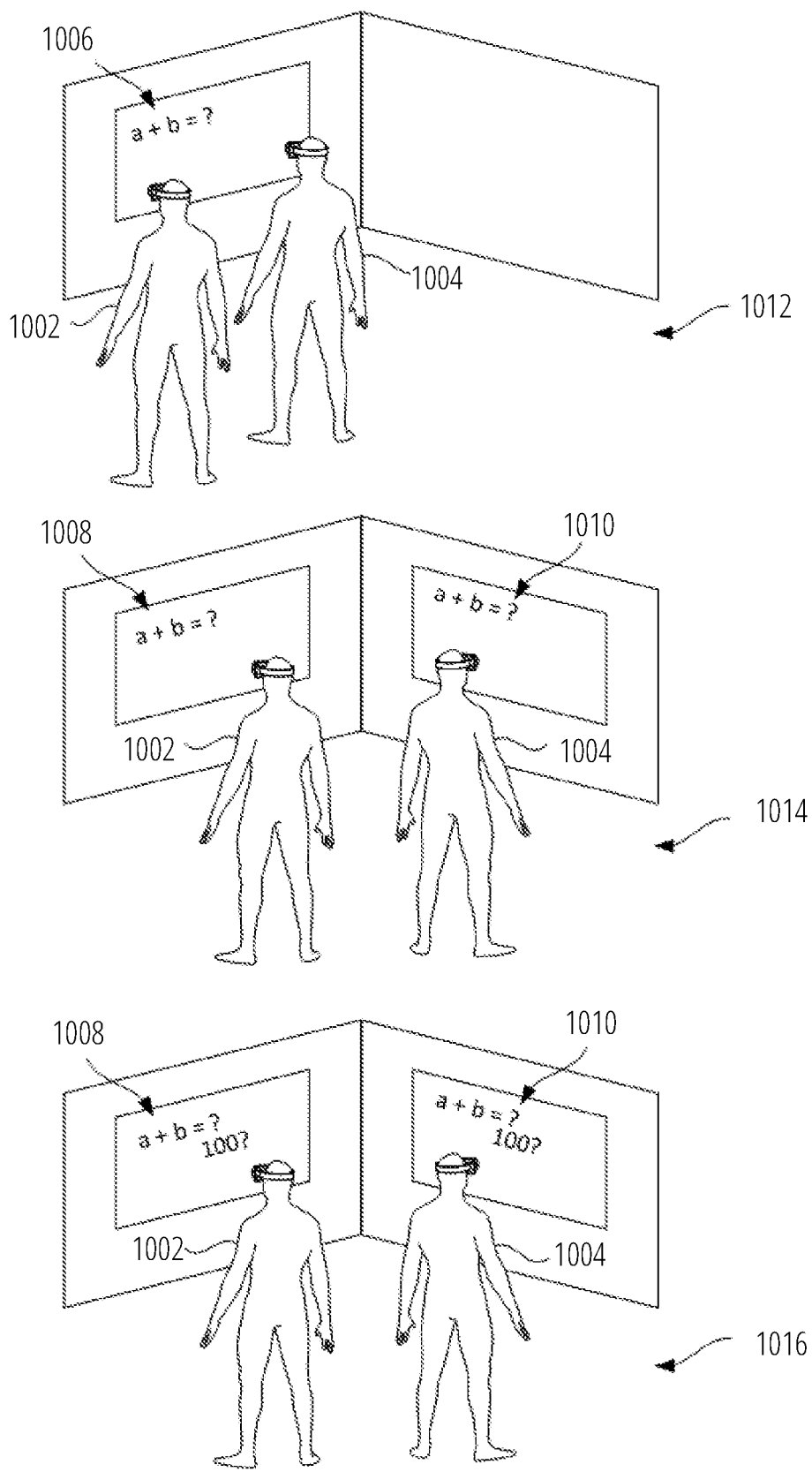
FIG. 10 is a set of schematic drawings that illustrate a desired use case for decoupling of shared virtual objects according to various aspects of the present disclosure.

FIG. 10 is a set of schematic drawings that illustrate a desired use case for decoupling of shared virtual objects according to various aspects of the present disclosure. In a first stage 1012, a first user 1002 and a second user 1004 are interacting with a shared object 1006 using a first augmented reality system 102 and a second augmented reality system 102, respectively. As illustrated, the shared object 1006 is a virtual whiteboard, and each user is able to make changes to the shared object 1006 that are propagated to each augmented reality system 102 and presented to each user. The shared object 1006 is presented at a first physical location for both the first user 1002 and the second user 1004.

In a second stage 1014, the second user 1004 has decided to decouple the virtual object they are interacting with from the virtual object the first user 1002 is interacting with. Accordingly, a first copy of the shared object 1008 remains at the first physical location as presented to the first user 1002, and a second copy of the shared object 1010 is moved to a second physical location specified by the second user 1004. All of the state of the virtual object remains copied between the first copy of the shared object 1008 and the second copy of the shared object 1010, but the physical locations of the presentations of the copies are different. This may be useful if too many users are present to congregate around the first physical location, if the second user 1004 has to leave the first physical location but wants to continue collaborating with the first user 1002, or for other reasons.

In a third stage 1016, further updates may be made to the shared object. For example, the second user 1004 may have added additional content to the second copy of the shared object 1010. As shown, the first augmented reality system 102 and the second augmented reality system 102 may continue to synchronize the states of the first copy of the shared object 1008 and the second copy of the shared object 1010, and the content added by the second user 1004 may appear in the first copy of the shared object 1008 presented to the first user 1002.

Figure 11:
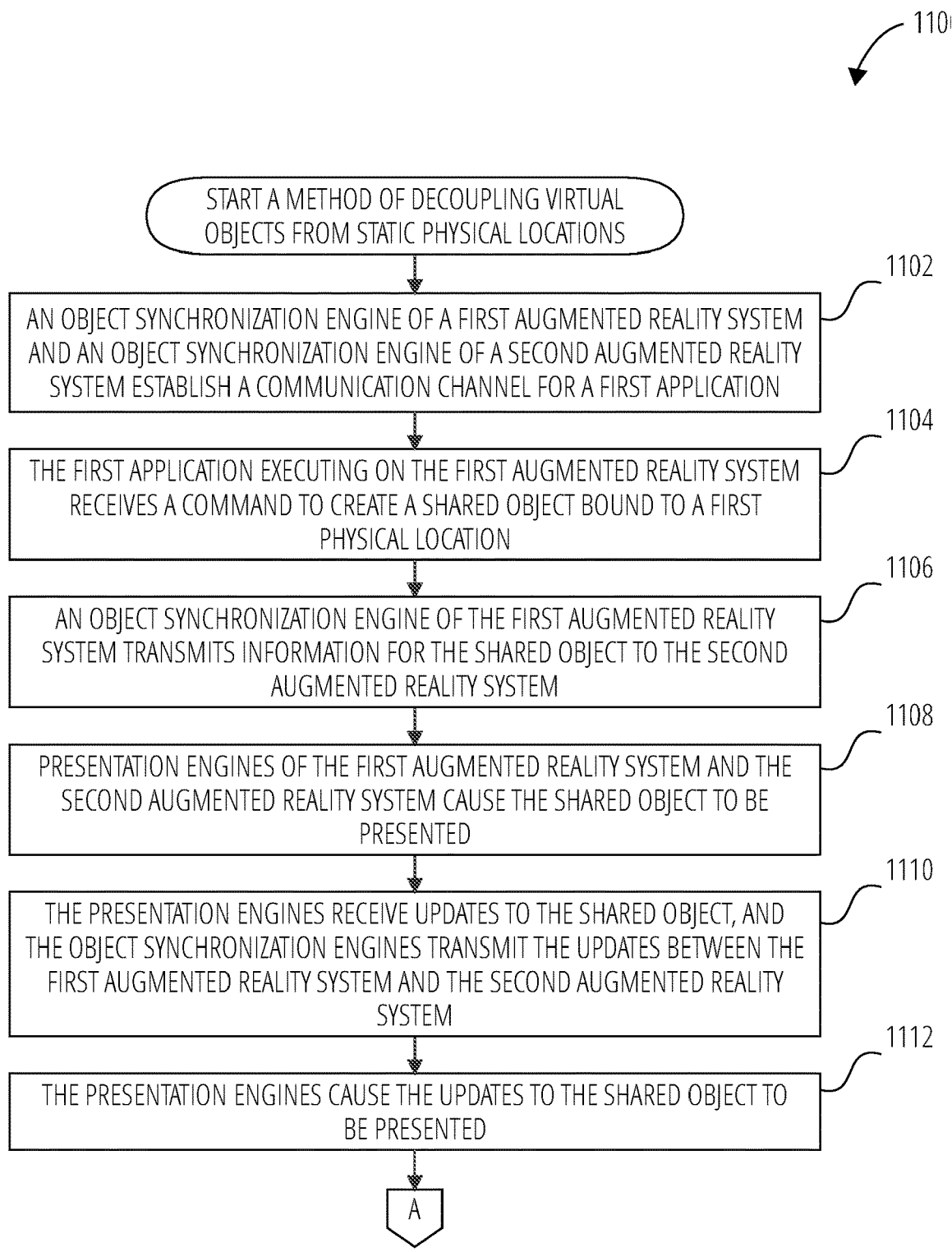
FIG. 11-FIG. 12 are a flowchart that illustrates a non-limiting example embodiment of a method of decoupling virtual objects from static physical locations according to various aspects of the present disclosure.
Figure 12:
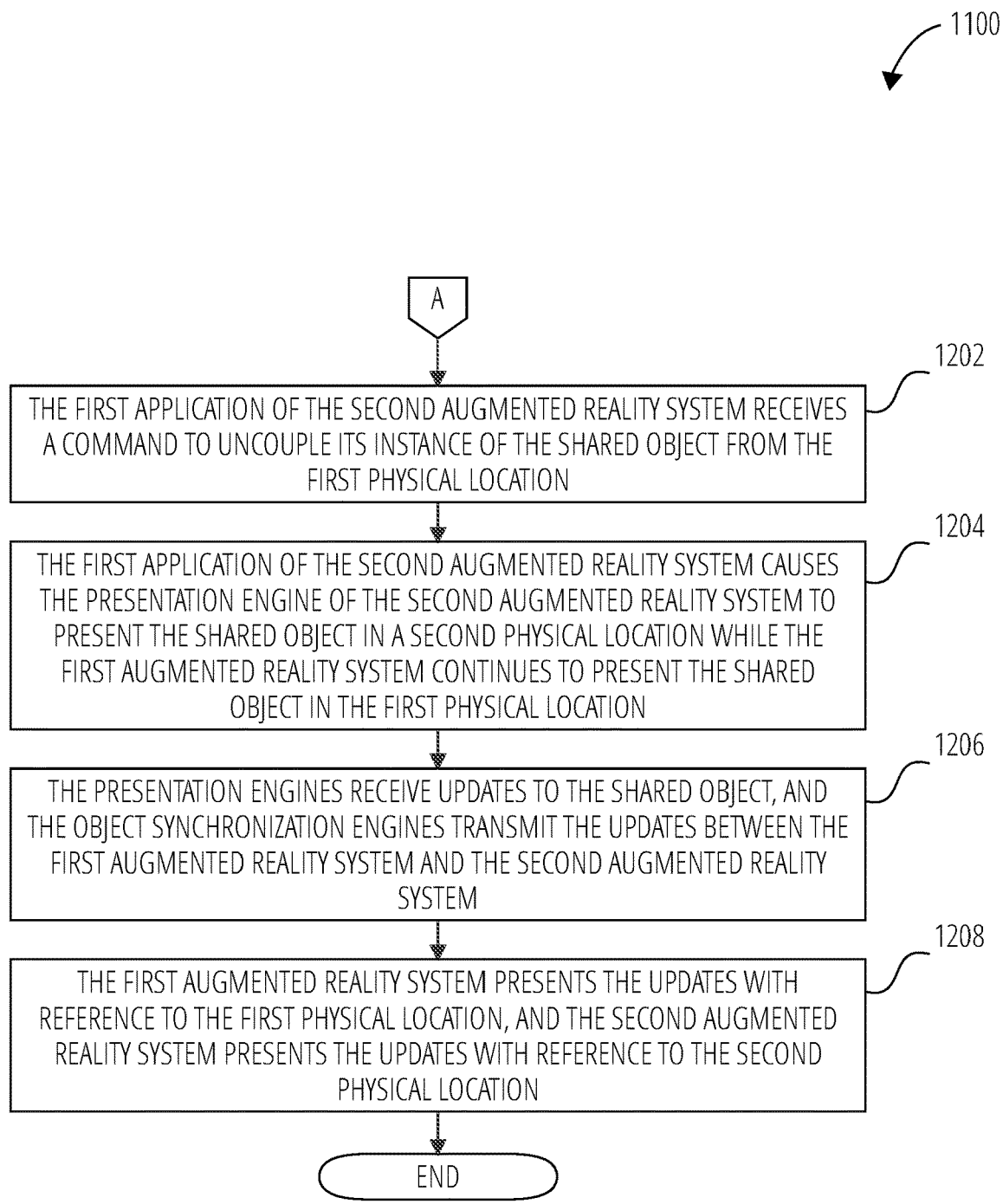

FIG. 11-FIG. 12 are a flowchart that illustrates a non-limiting example embodiment of a method of decoupling virtual objects from static physical locations according to various aspects of the present disclosure. The method 1100 is a non-limiting example of a method appropriate for providing the functionality illustrated in FIG. 10.

From a start block, the method 1100 proceeds to block 1102, where an object synchronization engine 124 of a first augmented reality system 102 and an object synchronization engine 124 of a second augmented reality system 102 establish a communication channel for a first application 116. The establishment of the communication channel is similar to the actions taken in block 402, and so is not described again here for the sake of brevity.

At block 1104, the first application 116 executing on the first augmented reality system 102 receives a command to create a shared object bound to a first physical location. At block 1106, an object synchronization engine 124 of the first augmented reality system 102 transmits information for the shared object to the second augmented reality system 102, and at block 1108, the presentation engine 122 of the first augmented reality system 102 and the presentation engine 122 of the second augmented reality system 102 cause the shared object to be presented. To this point, the creation, processing, and presentation of the shared object has proceeded similar to existing techniques for presenting shared virtual objects, and so the techniques are not described here in further detail. Any type of shared object may be presented, including but not limited to the shared whiteboard illustrated in FIG. 10.

At block 1110, the presentation engine 122 of the first augmented reality system 102 and the presentation engine 122 of the second augmented reality system 102 receive updates to the shared object, and the object synchronization engine 124 transmit the updates between the first augmented reality system 102 and the second augmented reality system 102. At block 1112, the presentation engine 122 of the first augmented reality system 102 and the presentation engine 122 of the second augmented reality system 102 cause the updates to the shared object to be presented. In some embodiments, the updates to the shared object may indicate content to be presented along with the shared object. For example, in the shared whiteboard example illustrated in FIG. 10, the updates may indicate markings to be presented at specific locations on the shared whiteboard. By synchronizing the updates between the first augmented reality system 102 and the second augmented reality system 102, the first user and the second user can be presented matching versions of the shared object and thereby have a shared experience.

The method 1100 then proceeds to a continuation terminal ("terminal A"). From terminal A (FIG. 12), the method 1100 proceeds to block 1202, where the first application 116 of the second augmented reality system 102 receives a command to uncouple its instance of the shared object from the first physical location. By uncoupling the instances of the shared object, the instances of the shared object may be moved to be associated with different physical locations.

At block 1204, the first application 116 of the second augmented reality system 102 causes the presentation engine 122 of the second augmented reality system 102 to present the shared object in a second physical location while the first augmented reality system 102 continues to present the shared object in the first physical location. In some embodiments, the only difference between the presentation of the shared object in the second physical location versus the presentation of the shared object in the first physical location is the location at which the instance is presented. That is, all other associated content, such as markings on the virtual whiteboard, may continue to be presented on both instances of the shared object, as illustrated at the second stage 1014 of FIG. 10.

At block 1206, the presentation engine 122 of the first augmented reality system 102 and the presentation engine 122 of the second augmented reality system 102 receive updates to the shared object, and the object synchronization engine 124 of the first augmented reality system 102 and the object synchronization engine 124 of the second augmented reality system 102 transmit the updates between the first augmented reality system 102 and the second augmented reality system 102. This is similar to the receipt and synchronization of the updates at block 1110.

At block 1208, the first augmented reality system 102 presents the updates with reference to the first physical location, and the second augmented reality system 102 presents the updates with reference to the second physical location. That is, the updates are presented by the first augmented reality system 102 with respect to the shared object at the first physical location, and the updates are presented by the second augmented reality system 102 with respect to the shared object at the second physical location. Even though the updates may be applied at a different physical location, the synchronization of the updates between each augmented reality system 102 ensures that a consistent presentation of the virtual object is provided, even for the physically separated instances, as illustrated for example at third stage 1016 of FIG. 10.

The method 1100 then proceeds to an end block and terminates. Though illustrated as terminating after block 1208, in some embodiments, the method 1100 may continue to operate to synchronize updates between each augmented reality system 102. Further, though only a first augmented reality system 102 and a second augmented reality system 102 were described, the method 1100 may also work with more than two augmented reality systems. Also, in some embodiments, the method 1100 may provide the ability to re-couple the de-coupled instances of the virtual object to each other, such that each copy of the virtual object would again be presented at the same physical location.

Figure 13:
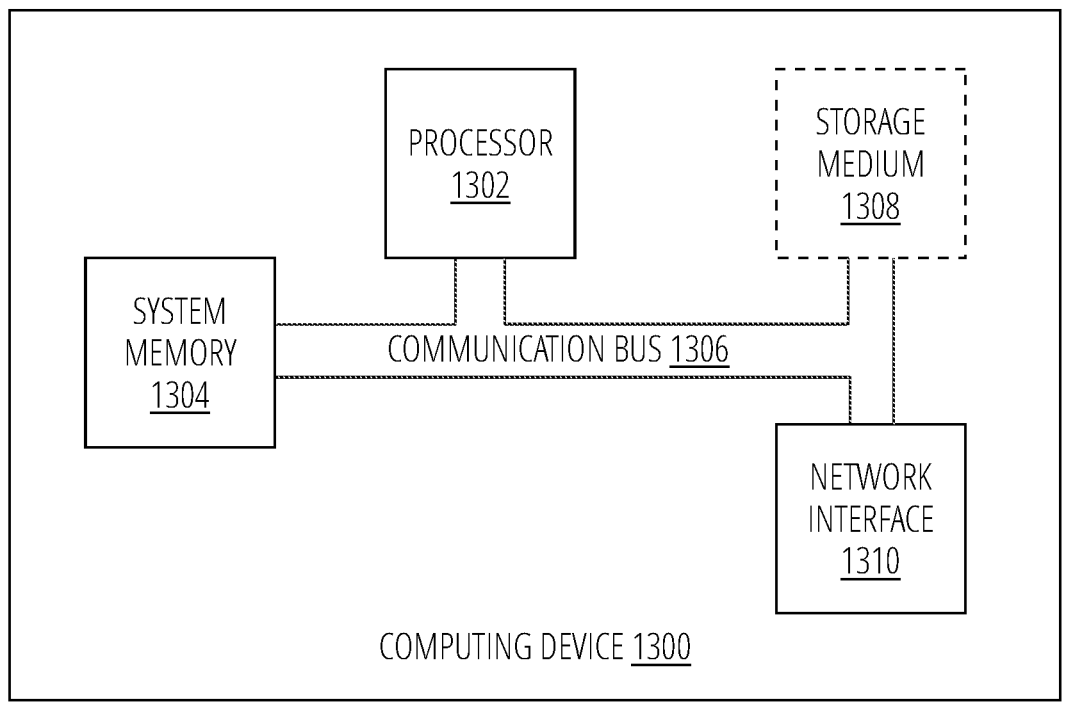
FIG. 13 is a block diagram that illustrates a non-limiting example embodiment of a computing device appropriate for use as a computing device with embodiments of the present disclosure.

FIG. 13 is a block diagram that illustrates aspects of an exemplary computing device 1300 appropriate for use as a computing device of the present disclosure. While multiple different types of computing devices were discussed above, the exemplary computing device 1300 describes various elements that are common to many different types of computing devices. While FIG. 13 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Some embodiments of a computing device may be implemented in or may include an application-specific integrated circuit (ASIC), a field-programmable gate array (FPGA), or other customized device. Moreover, those of ordinary skill in the art and others will recognize that the computing device 1300 may be any one of any number of currently available or yet to be developed devices.

In its most basic configuration, the computing device 1300 includes at least one processor 1302 and a system memory 1304 connected by a communication bus 1306. Depending on the exact configuration and type of device, the system memory 1304 may be volatile or nonvolatile memory, such as read only memory ("ROM"), random access memory ("RAM"), EEPROM, flash memory, or similar memory technology. Those of ordinary skill in the art and others will recognize that system memory 1304 typically stores data and/or program modules that are immediately accessible to and/or currently being operated on by the processor 1302. In this regard, the processor 1302 may serve as a computational center of the computing device 1300 by supporting the execution of instructions.

As further illustrated in FIG. 13, the computing device 1300 may include a network interface 1310 comprising one or more components for communicating with other devices over a network. Embodiments of the present disclosure may access basic services that utilize the network interface 1310 to perform communications using common network protocols. The network interface 1310 may also include a wireless network interface configured to communicate via one or more wireless communication protocols, such as Wi-Fi, 2G, 3G, LTE, WiMAX, Bluetooth, Bluetooth low energy, and/or the like. As will be appreciated by one of ordinary skill in the art, the network interface 1310 illustrated in FIG. 13 may represent one or more wireless interfaces or physical communication interfaces described and illustrated above with respect to particular components of the computing device 1300.

In the exemplary embodiment depicted in FIG. 13, the computing device 1300 also includes a storage medium 1308. However, services may be accessed using a computing device that does not include means for persisting data to a local storage medium. Therefore, the storage medium 1308 depicted in FIG. 13 is represented with a dashed line to indicate that the storage medium 1308 is optional. In any event, the storage medium 1308 may be volatile or nonvolatile, removable or nonremovable, implemented using any technology capable of storing information such as, but not limited to, a hard drive, solid state drive, CD ROM, DVD, or other disk storage, magnetic cassettes, magnetic tape, magnetic disk storage, and/or the like.

Suitable implementations of computing devices that include a processor 1302, system memory 1304, communication bus 1306, storage medium 1308, and network interface 1310 are known and commercially available. For ease of illustration and because it is not important for an understanding of the claimed subject matter, FIG. 13 does not show some of the typical components of many computing devices. In this regard, the computing device 1300 may include input devices, such as a keyboard, keypad, mouse, microphone, touch input device, touch screen, tablet, and/or the like. Such input devices may be coupled to the computing device 1300 by wired or wireless connections including RF, infrared, serial, parallel, Bluetooth, Bluetooth low energy, USB, or other suitable connections protocols using wireless or physical connections. Similarly, the computing device 1300 may also include output devices such as a display, speakers, printer, etc. Since these devices are well known in the art, they are not illustrated or described further herein.

While illustrative embodiments have been illustrated and described, it will be appreciated that various changes can be made therein without departing from the spirit and scope of the invention.

What is claimed is:

1. A computer-implemented method of providing visual cues for private virtual objects, the method comprising:
   receiving, by a first augmented reality system, an object definition for a virtual object generated by a second augmented reality system, wherein the object definition includes a location and a protected characteristic;
   determining, by the first augmented reality system, whether presentation of the protected characteristic by the first augmented reality system is permitted;
   in response to determining that presentation of the protected characteristic by the first augmented reality system is permitted, presenting, by the first augmented reality system, the virtual object including the protected characteristic at the location; and
   in response to determining that presentation of the protected characteristic by the first augmented reality system is not permitted, presenting, by the first augmented reality system, a placeholder object at the location.

2. The computer-implemented method of claim 1, wherein the object definition further includes a definition of the placeholder object.

3. The computer-implemented method of claim 1, wherein presenting the placeholder object includes presenting a shape of the virtual object without presenting the protected characteristic of the virtual object.

4. The computer-implemented method of claim 1, wherein presenting the placeholder object includes presenting at the location a predetermined shape, wherein the predetermined shape is not based on the object definition.

5. The computer-implemented method of claim 1, wherein determining whether presentation of the protected characteristic by the first augmented reality system is permitted includes:
   comparing, by the first augmented reality system, a user credential associated with the first augmented reality system to a set of user credentials permitted to present the protected characteristic of the virtual object.

6. The computer-implemented method of claim 1, wherein determining whether presentation of the protected characteristic by the first augmented reality system is permitted includes:
   receiving, by the first augmented reality system from an authoritative system for the virtual object, an indication of whether a user credential associated with the first augmented reality system is permitted to present the protected characteristic of the virtual object.

7. A computer-implemented method of protecting a location from undesirable virtual objects, the method comprising:
- receiving, by a first augmented reality system, an object definition for a virtual object, wherein the object definition includes a location and a mesh for the object;
- determining, by the first augmented reality system, whether the location is associated with a protected location;
- in response to determining that the location is associated with a protected location, presenting a low-invasiveness version of the mesh; and
- in response to determining that the location is not associated with a protected location, presenting a default version of the mesh.

8. The computer-implemented method of claim 7, further comprising receiving, by the first augmented reality system, the protected location from a second augmented reality system.

9. The computer-implemented method of claim 8, wherein receiving the protected location from the second augmented reality system includes receiving an indication of a physical location from the second augmented reality system.

10. The computer-implemented method of claim 8, wherein receiving the protected location from the second augmented reality system includes receiving an indication of a location relative to a protected virtual object from the second augmented reality system.

11. The computer-implemented method of claim 7, wherein presenting the low-invasiveness version of the mesh at the location includes:
- determining a distance between the location and the protected location; and
- changing a characteristic of the mesh based on the distance.

12. The computer-implemented method of claim 11, wherein changing the characteristic of the mesh based on the distance includes at least one of:
- changing an opacity of at least a portion of the mesh based on the distance;
- changing a size of the mesh;
- changing a color of at least a portion of the mesh; and
- changing the location for the object.

13. The computer-implemented method of claim 12, wherein changing the opacity of at least a portion of the mesh based on the distance includes changing the opacity to zero if the distance is less than a first threshold distance value, leaving a specified opacity of the mesh unchanged if the distance is greater than a second threshold distance value, and changing the opacity to a value between zero and the specified opacity of the mesh if the distance is between the first threshold distance value and the second threshold distance value.

14. The computer-implemented method of claim 7, wherein determining whether the location is associated with a protected location includes comparing, by the first augmented reality system, the location to a list of protected locations.

15. The computer-implemented method of claim 7, wherein determining whether the location is associated with a protected location includes receiving, by the first augmented reality system, an indication from an authoritative system regarding whether the location is associated with a protected location.

16. A computer-implemented method of decoupling a virtual object from a static physical location, the method comprising:
- receiving, by a first augmented reality system, an object definition for a virtual object, wherein the object definition includes a first location and a mesh;
- presenting, by the first augmented reality system, the mesh at the first location;
- receiving, by the first augmented reality system, a command to decouple the virtual object from the first location;
- presenting, by the first augmented reality system, the mesh at a second location other than the first location;
- receiving, by the first augmented reality system, updates for the virtual object at the second location;
- presenting, by the first augmented reality system, the updates for the virtual object at the second location; and
- transmitting, by the first augmented reality system, the updates for the virtual object for presentation in association with the virtual object at the first location.

17. The computer-implemented method of claim 16, further comprising:
- receiving, by a second augmented reality system, the object definition for the virtual object;
- presenting, by the second augmented reality system, the mesh at the first location; and
- continuing, by the second augmented reality system, to present the mesh at the first location after the first augmented reality system receives the command to decouple the virtual object from the first location.

18. The computer-implemented method of claim 17, further comprising:
- receiving, by the second augmented reality system, the updates for the virtual object from the first augmented reality system; and
- presenting, by the second augmented reality system, the updates for the virtual object in association with the virtual object at the first location.

19. The computer-implemented method of claim 16, further comprising:
- receiving, by the first augmented reality system, updates for the virtual object at the first location; and
- presenting, by the first augmented reality system, the updates for the virtual object in association with the virtual object at the second location.

\* \* \* \* \*